Dec. 6, 1932.  J. OFTEDAHL  1,890,127
ARTIFICIAL SNOW
Filed Aug. 16, 1929
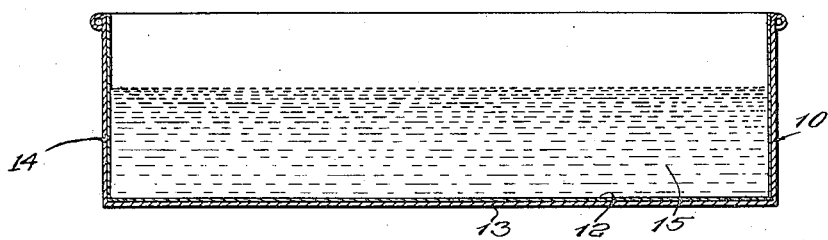
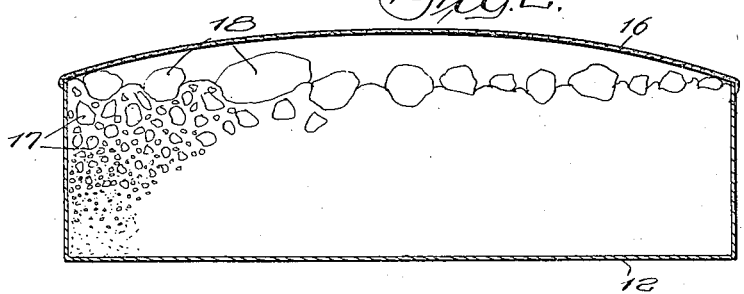
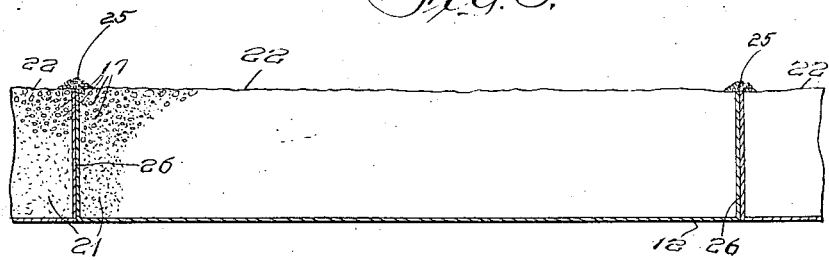
Witness:
William R. Kilroy
Inventor
John Oftedahl
By Fisher, Clapp, Soans & Bond
Attys

UNITED STATES PATENT OFFICE

JOHN OFTEDAHL, OF CHICAGO, ILLINOIS

ARTIFICIAL SNOW

Application filed August 16, 1929. Serial No. 386,444.

My invention relates broadly to decorative materials and has more particularly to do with a new article of manufacture which is especially adapted for decorative purposes in the simulation of snow or the like.

Many different compositions of matter and substances have been used in the past to represent snow, but most of them are either lacking in the brilliant white color which is found in clean snow, or lacking in the peculiar porous crystalline structure presented by the surface of a body of snow. It is desired of course that any material which will satisfactorily imitate snow will have not only the above properties of color and structure, but will also be sufficiently stable to permit storage over long periods so that same may be preserved from year to year and used over and over again, and also will be sufficiently stable to permit transportation thereof under modern conditions without deterioration.

An object of my invention therefore is to provide a new article of manufacture which will have all of the above advantages, and others which will be hereinafter pointed out.

A further object is to provide a method of producing the article referred to above, which method will be simple, efficient and economical for the purposes desired.

Various other objects and advantages will become apparent to those skilled in the art as the description proceeds.

Referring now to the drawing forming a part of this specification,

Fig. 1 is a sectional view showing a stage in the preparation of an article embodying my invention and showing certain preferred apparatus used in the process;

Fig. 2 is a similar view showing the article at an intermediate stage in the process; and Fig. 3 is a sectional view of the completed article.

Describing now a preferred embodiment of my invention, it has been discovered by me that when the material commonly known as water glass, comprising silicate of sodium or of potassium or similar material, is heated, under certain conditions, this material puffs up to form a cellular mass. This mass is of a brilliant white color and has sufficient tensile strength to support itself in cake or slab form. However, the upper surface thereof comprises a crust having a dull appearance and hence upon close inspection does not resemble snow; but I have found that by removing the upper crust of the material, the lower body presents an appearance which is remarkably similar to that of a body of snow.

In the preferred practice of my invention, I use a shallow container, such as a pan or the like, as represented at 10 in Fig. 1; a sheet 12 of paper, cloth, screening, or other suitable material is preferably placed on the bottom 13 and sides 14 of the pan 10 and a suitable quantity of water glass 15 or the like, comprising about 75 per cent water, is then poured into the pan so as to rest on the sheet 12. The quantity of material 15 is such as to occupy approximately an inch in depth. The pan 10 and contents are then placed in any suitable oven and subjected to heat of approximately 300 degrees Fahrenheit for about two and one-half hours more or less, when the material will be substantially dehydrated.

In the course of the heating an elastic and coarsely granular crust 16 will first be formed on top of the material 15 which will gradually rise a few inches as the result of increased vapor pressure within the material in the pan. The heat is maintained to such an extent that the crust above referred to will be maintained above and separated from the main body of boiling material.

At the end of say two and one-half hours, assuming that the baking has taken place at about 300 degrees, the thickness of the slab should be approximately four to six inches. The crust above referred to will be readily removable from the rest of the material, and the main body after removal from the pan 10 will have a plurality of vesicles or cavities 17 throughout the mass, the upper surface thereof as shown clearly in Fig. 2 comprising a mass of larger bubbles 18.

The final product has a brilliant white glistening surface 22 which is for all practical purposes a perfect simulation of snow. The slab as described above will, when completed, be approximately 4″ to 6″ in thickness, the lower portion 21, constituting approximately a half of the material, being hard and dense and serving as a binder in holding the product together. The top portion, which is rough and bubbly, is brittle and could not be easily handled without fracture, were it not for the binding effect of the lower portion. A special advantage of products prepared in accordance with my invention is that the slabs have a soft porous appearance such as is immediately associated with snow, while at the same time they are sufficiently strong, due to the binding effect of the compact lower portion of the slab, to be readily transported and used without danger of disintegration. The underlying sheet 12, of course, serves to facilitate the removal of the slab from the pan and also aids in strengthening the slab so as to prevent fracture thereof.

Where the size of the display is such that it is desirable to use a plurality of slabs, I place a number of slabs in juxtaposition (Fig. 3) and then place a number of lumps 25 of material which may be plucked from the surface of the slabs, along the line 26 where the slabs come together. The line is thus hidden and the effect is given of a continuous mass of snow.

I claim as my invention:

1. As a new article of manufacture, artificial snow comprising a self-supporting slab of soluble silicate having a fragmentary, light-reflecting surface.

2. As a new article of manufacture, artificial snow comprising a coherent mass of soluble silicate having a large number of air vesicles therein.

3. As a new article of manufacture, artificial snow comprising a self-supporting slab of soluble silicate having a large number of air vesicles therein, said mass having a sheet of material secured to a surface thereof for increasing the tensile strength of said mass.

4. A method of producing artificial snow comprising heating a soluble silicate to a frothy and substantially dehydrated condition and removing the upper crust therefrom.

5. The method of forming a slab of artificial snow comprising applying sufficient heat to an aqueous layer of an alkaline silicate to effect the formation of an elastic crust on its upper surface and, while maintaining the crust upon the upper surface of the layer, continuing the application of heat to remove a substantial portion of the water by evaporation and swell the layer of dry silicate thus obtained, and finally removing the crust to expose a light-reflecting upper surface, substantially as described.

6. As a new article of manufacture, a slab of artificial snow comprising a swollen body of alkaline silicate from which water has been evaporated and having air vesicles distributed throughout the body thereof so that said slab has a relatively dense lower portion supporting and serving as a binder for a light brittle upper portion having a light-reflecting surface substantially as described.

7. A method of producing artificial snow, comprising heating a soluble silicate in an open container at a baking temperature until the material is substantially dehydrated, an elastic crust being formed over the upper surface of the material in the course of heating, and finally removing said crust.

8. As a new article of manufacture, a display comprising a plurality of slabs of material as defined in claim 1, said slabs being arranged contiguous to each other, and small portions of material similar to that of said slabs being disposed so as to conceal the line of juncture between said slabs.

9. As a new article of manufacture, a display comprising a plurality of slabs of material as defined in claim 1, said slabs being arranged contiguous to each other, and small loose portions of material similar in physical properties to that forming the surface material of said slabs being disposed so as to conceal the line of juncture between said slabs.

JOHN OFTEDAHL.